United States Patent
Johnstone

(10) Patent No.: US 11,815,061 B2
(45) Date of Patent: Nov. 14, 2023

(54) TIDAL POWER GENERATION SYSTEM

(71) Applicant: AQUATIC ENERGY PTY LTD, Forresters Beach (AU)

(72) Inventor: Garrie Johnstone, Forresters Beach (AU)

(73) Assignee: AQUATIC ENERGY PTY LTD, Forresters Beach (AU)

( * ) Notice: Subject to any disclaimer, the term of this patent is extended or adjusted under 35 U.S.C. 154(b) by 0 days.

(21) Appl. No.: 17/904,066

(22) PCT Filed: Mar. 19, 2021

(86) PCT No.: PCT/AU2021/050248
§ 371 (c)(1),
(2) Date: Aug. 11, 2022

(87) PCT Pub. No.: WO2021/189102
PCT Pub. Date: Sep. 30, 2021

(65) Prior Publication Data
US 2023/0114062 A1  Apr. 13, 2023

(30) Foreign Application Priority Data
Mar. 27, 2020  (AU) ................. 2020900942

(51) Int. Cl.
*F03B 13/26* (2006.01)
*F03B 13/18* (2006.01)
(52) U.S. Cl.
CPC .......... *F03B 13/262* (2013.01); *F03B 13/186* (2013.01); *F03B 13/1845* (2013.01)

(58) Field of Classification Search
CPC ...... F03B 13/16; F03B 13/18; F03B 13/1845; F03B 13/1855; F03B 13/186; F03B 13/20; F03B 13/262
See application file for complete search history.

(56) References Cited

U.S. PATENT DOCUMENTS 1,018,161 A   2/1912  Brown
4,355,511 A * 10/1982 Jones ................. F03B 13/1845
                                                       60/507

(Continued)

FOREIGN PATENT DOCUMENTS

CN  103850884 A  6/2014
DE  19958409 A1  6/2001

(Continued)

OTHER PUBLICATIONS

International Search Report & Written Opinion dated May 25, 2021 from PCT Application No. PCT/AU2021/050248, 9 pages.

(Continued)

*Primary Examiner* — Mickey H France
(74) *Attorney, Agent, or Firm* — INNOVATION CAPITAL LAW GROUP, LLP; Vic Lin

(57) ABSTRACT

A tidal power generation system has a vertical post being embedded in a sea floor and a floating barge operably coupled to the post. The floating barge has a gear rotationally driven by the post as the floating barge moves vertically with respect to the vertical post. An offshore hydraulic pump is operably connected to the gear, an onshore hydraulic motor operably connected to the offshore hydraulic pump by a hydraulic circuit; and an electric generator is operably connected to the onshore hydraulic motor.

15 Claims, 1 Drawing Sheet

(56) References Cited

U.S. PATENT DOCUMENTS

| | | | |
|---|---|---|---|
| 4,627,240 A | 12/1986 | Holmes | |
| 8,745,981 B1 | 6/2014 | Hanna | |
| 10,415,539 B1 * | 9/2019 | Osterman | E02B 9/08 |
| 2009/0072540 A1 | 3/2009 | McCague et al. | |
| 2010/0018196 A1 * | 1/2010 | Li | B60T 1/10 |
| | | | 60/415 |
| 2011/0304144 A1 * | 12/2011 | Dehlsen | E02B 9/08 |
| | | | 290/53 |
| 2015/0082785 A1 * | 3/2015 | Rohrer | F03B 13/186 |
| | | | 60/500 |
| 2016/0032887 A1 * | 2/2016 | Patton | F03B 13/1865 |
| | | | 60/504 |
| 2018/0058419 A1 | 3/2018 | Liao et al. | |
| 2018/0363620 A1 | 12/2018 | Scoggins | |

FOREIGN PATENT DOCUMENTS

| | | |
|---|---|---|
| ES | 1102183 U | 3/2014 |
| GB | 196017 A | 4/1923 |
| WO | 2003098033 A1 | 11/2003 |
| WO | 2016195600 A1 | 12/2016 |

OTHER PUBLICATIONS

International-type search dated Dec. 18, 2020 from Australia Application No. 2020900942, 13 pages.

* cited by examiner

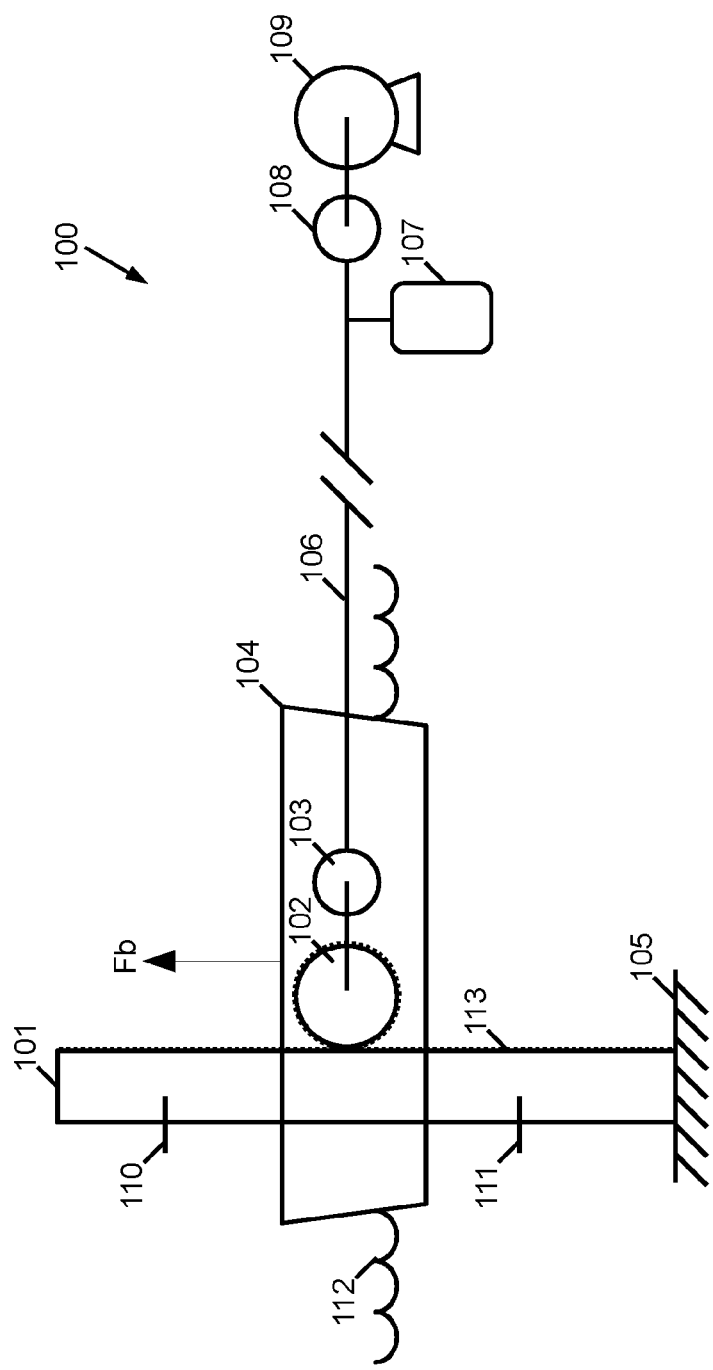

TIDAL POWER GENERATION SYSTEM

FIELD OF THE INVENTION

This invention relates generally to tidal power generation systems.

BACKGROUND OF THE INVENTION

Tidal power generation systems include tidal stream generation systems wherein kinetic energy of moving water is used to power turbines and tidal barrage systems which convert potential energy of a difference in height (hydraulic head) between high and low tides to mechanical energy using turbines.

The present invention seeks to provide a tidal power generation system, which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

There is provided herein a tidal power generation system which comprises a floating barge operably engaged to a vertical post embedded within the seafloor. The vertical post comprises a rack gear which drives a corresponding pinion gear of the barge. As such, as the floating barge rises and falls on the tide with respect to the vertical post, floating barge generates a buoyancy force corresponding to the displacement of the floating barge which is used to rotate the pinion gear.

The pinion gear drives an offshore hydraulic pump which pressurises hydraulic fluid along a hydraulic circuit which comes ashore to drive a corresponding onshore hydraulic motor which, in turn, drives a corresponding electric generator to generate electricity onshore.

The utilisation of the floating barge by the present system is able to utilise the relatively large buoyancy force generated by the floating barge, especially where the floating barge has large displacement, as compared to conventional tidal steam forces which rely on tidal flow.

Furthermore, the significant buoyancy forces generated by the floating barge may be used to highly pressurises the hydraulic fluid or drive ratio gearing to increase the rotation speed of the pinion gear.

Furthermore, the utilisation of the hydraulic circuit coming ashore avoids having offshore electronic componentry which may otherwise be corroded or damaged by the harsh offshore operational environment.

In embodiments, the hydraulic circuit may comprise bidirectional conduits such that the hydraulic fluid is pumped in a circuit. In alternative embodiments, the hydraulic circuit comprises a single conduit comprising hydraulic fluid reservoirs at either end wherein, for example, as the tide rises further may be pumped offshore and vice versa.

The system may comprise an onshore hydraulic fluid reservoir and an offshore hydraulic reservoir operably coupled at respective ends of the hydraulic circuit.

According to one aspect, there is provided a tidal power generation system comprising: a vertical post being embedded in a sea floor; a floating barge operably coupled to the post, the floating barge having a gear rotationally driven by the post as the floating barge moves vertically with respect to the vertical post; an offshore hydraulic pump operably connected to the gear; an onshore hydraulic motor operably connected to the offshore hydraulic pump by a hydraulic circuit; and an electric generator operably connected to the onshore hydraulic motor, wherein the system further comprises an onshore hydraulic fluid reservoir and an offshore hydraulic reservoir operably coupled at respective ends of the hydraulic circuit.

The vertical post may comprise a rack gear therealong and the gear may be a pinion gear.

The hydraulic circuit may be dual channelled in comprising a first channel and a second return channel such that hydraulic fluid within the hydraulic circuit circulates between the hydraulic motor and the hydraulic pump via the first channel and the second return channel.

The hydraulic circuit may comprise a single hydraulic channel so that hydraulic fluid flows from the pump to the motor via the channel and then back from the motor to the pump via the channel.

When the barge rises with respect to the post, the system may pump hydraulic fluid to one of the reservoirs and, when the barge falls with respect to the post, the system may pump hydraulic fluid to another of the reservoirs.

The reservoirs may each have sufficient capacity to store an amount of hydraulic fluid pumped by the pump between upper and lower travel limits of the barge.

The displacement of the barge may be configured according to a desirous hydraulic pressurisation.

The system may further comprise ratio gearing between the pinion gear and the hydraulic pump.

The ratio gearing may be configured according to a desirous ratio between a displacement force of the barge and a rotational force imparted on the pinion gear.

The ratio gearing may be configured according to a desirous number of pinion gear rotations between upper and lower travel limits of the barge.

The system may further comprise a pressurisation vessel operably coupled to the hydraulic circuit, the pressurisation vessel comprising pressurised gas therein used to assist the motor.

The pressurisation vessel may assist pressurisation of hydraulic fluid within the hydraulic circuit.

The pressurisation vessel may assist the motor when the barge may be towards upper or lower travel limits thereof.

The vessel may be repressurised using pressure from the hydraulic circuit.

The vessel may be repressurised by at least one of the motor and the generator.

The vessel may be repressurised using pressure from the hydraulic circuit when the barge may be between upper and lower travel limits thereof.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which:

FIG. 1 shows a tidal power generation system in accordance with an embodiment.

DESCRIPTION OF EMBODIMENTS

FIG. 1 shows a tidal power generation system 100. The system 100 comprises a vertical post 101 embedded within a seafloor 105. The vertical post 101 may comprise a rack gear 113 therealong.

The system 100 furthermore comprises a floating barge 104 which is horizontally restrained by the post 101 and floats on a water surface 112 within a tidal area such as in an estuary, seashore or the like to generate a buoyancy force Fb.

The floating barge 104 may comprise a pinion gear 102 rotationally driven by the rack gear 113. As such, as the floating barge 104 moves vertically with respect to the post 101, the pinion gear 102 rotates. In this way, the buoyancy force Fb is converted to a rotational force of the pinion gear 102. Other mechanical arrangements may be utilised to impart a rotational force from the linear displacement of the barge 104 with respect to the post 101.

In the embodiments shown, the barge 104 is retained by a single post 101. However, in other embodiments, the barge 104 may be retained by a plurality of posts 101 of which one or a subset may comprise a rack gear 113.

The barge 104 may move vertically with respect to the post 101 between an upper travel limit 110 and a lower travel limit 111 dictated by the highs and lows of the tide which may vary over time.

The floating barge 104 may further comprise an offshore hydraulic pump 103 operably coupled to the pinion gear 102. As such, the pinion gear 102 drives the hydraulic pump 103 to pressurise hydraulic fluid in the manner described herein. In embodiments, the pinion gear 102 may drive the hydraulic pump 103 directly.

A gearing mechanism (not shown) may be disposed between the pinion gear 102 and the hydraulic pump 103 to control the drive ratio therebetween. The gearing mechanism may be set such that the pinion gear 102 rotates a set amount of revolutions between the upper and lower travel limits 110, 111. Alternatively, the gearing ratio mechanism may be configured according to a desirous ratio between the displacement force FB of the barge 104 and a rotational force imparted on the pinion gear 102.

The system 100 may further comprise an onshore hydraulic motor 108. The onshore hydraulic motor 108 is operably connected to the hydraulic pump 103 by way of a hydraulic circuit 106.

In embodiments, the hydraulic circuit 106 may be dual channelled (i.e. having a first channel and a second return channel) so that hydraulic fluid circulates between the pump 103 and motor 108 (i.e. flows from the pump 103 to the motor 108 via the first channel and flows back from the motor 108 to the pump 103 via the second return channel).

However, in other embodiments, the hydraulic circuit 106 may have a single hydraulic channel between the pump 103 and motor 108 so that hydraulic fluid flows from the pump 103 to the motor 108 via the channel and then flows back from the motor 108 to the pump 103 via the same channel.

The circuit 106 may have hydraulic fluid retention reservoirs at either end thereof. As such, hydraulic fluid may flow onshore and be stored in an onshore retention reservoir (not shown) as the tide is rising and flow offshore into an offshore retention reservoir (not shown) located on the barge 104 when the tide is falling. The reservoirs may have sufficient capacity to store an amount of hydraulic fluid pumped by the pump 103 between the upper and lower travel limits 110, 111.

The system 100 further comprises an electric generator 109 operably coupled to the onshore hydraulic motor 108. As such, the onshore hydraulic motor 108 is hydraulically driven under pressurisation of the offshore hydraulic pump 103 which in turn drives the electric generator 109 to generate electricity.

In embodiments, the system 100 may comprise a pressurisation vessel 107 operably coupled to the hydraulic circuit 106. The pressurisation vessel may comprise a compressible inert gas which is pressurised by the hydraulic fluid within the circuit 106 either directly or via a piston.

In this way, the pressurisation of the vessel 107 may be used to assist the hydraulic motor 108 when the hydraulic pressurisation from the pump 103 falls as the rate of rise or fall of the barge 104 falls when the barge 104 is towards the upper or lower travel limits 110, 111 at high and low tide respectively. The pressurisation of the vessel 107 may be increased under assistance of the motor 108 or the power from the generator 109 when hydraulic pressurisation from the pump 103 increases as the rate of rise or fall of the barge 104 increases when the barge 104 is between the upper or lower travel limits 110, 111 between high and low tides.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A tidal power generation system comprising:
a vertical post embedded in a sea floor;
a floating barge operably coupled to the post, the floating barge having a gear rotationally driven by the post as the floating barge moves vertically with respect to the vertical post;
an offshore hydraulic pump operably connected to the gear;
an onshore hydraulic motor operably connected to the offshore hydraulic pump by a hydraulic circuit; and
an electric generator operably connected to the onshore hydraulic motor, wherein the system further comprises an onshore hydraulic fluid reservoir and an offshore hydraulic reservoir operably coupled at respective ends of the hydraulic circuit,
wherein the hydraulic circuit comprises a single hydraulic channel so that hydraulic fluid flows from the pump to the motor via the channel and then back from the motor to the pump via the channel.

2. The tidal power generation system as claimed in claim 1, wherein the vertical post comprises a rack gear therealong and wherein the gear is a pinion gear.

3. The tidal power generation system as claimed in claim 1, wherein the hydraulic circuit is dual channelled in comprising a first channel and a second return channel and wherein hydraulic fluid within the hydraulic circuit circulates between the hydraulic motor and the hydraulic pump via the first channel and the second return channel.

4. The tidal power generation system as claimed in claim 1, wherein, when the barge rises with respect to the post, the system pumps hydraulic fluid to one of the reservoirs and, when the barge falls with respect to the post, the system pumps hydraulic fluid to another of the reservoirs.

5. The tidal power generation system as claimed in claim 4, wherein the reservoirs each have sufficient capacity to store an amount of hydraulic fluid pumped by the pump between upper and lower travel limits of the barge.

6. The tidal power generation system as claimed in claim 1, wherein the displacement of the barge is configured according to a desirous hydraulic pressurisation.

7. The tidal power generation system as claimed in claim 1, further comprising ratio gearing between the pinion gear and the hydraulic pump.

8. The tidal power generation system as claimed in claim 7, wherein the ratio gearing is configured according to a desirous ratio between a displacement force of the barge and a rotational force imparted on the pinion gear.

9. The tidal power generation system as claimed in claim 7, wherein the ratio gearing is configured according to a desirous number of pinion gear rotations between upper and lower travel limits of the barge.

10. The tidal power generation system as claimed in claim 1, further comprising a pressurisation vessel operably coupled to the hydraulic circuit, the pressurisation vessel comprising pressurised gas therein used to assist the motor.

11. The tidal power generation system as claimed in claim 10, wherein the pressurisation vessel assists pressurisation of hydraulic fluid within the hydraulic circuit.

12. The tidal power generation system as claimed in claim 10, wherein the pressurisation vessel assists the motor when the barge is towards upper or lower travel limits thereof.

13. The tidal power generation system as claimed in claim 10, wherein the vessel is repressurised using pressure from the hydraulic circuit.

14. The tidal power generation system as claimed in claim 13, wherein the vessel is repressurised by at least one of the motor and the generator.

15. The tidal power generation system as claimed in claim 13, wherein the vessel is repressurised using pressure from the hydraulic circuit when the barge is between upper and lower travel limits thereof.

\* \* \* \* \*